United States Patent
Yan et al.

(10) Patent No.: US 10,715,681 B2
(45) Date of Patent: *Jul. 14, 2020

(54) NETWORK INTERFACE FOR TRACKING RADIO RESOURCE UTILIZATION

(71) Applicant: Verizon Patent and Licensing Inc., Arlington, VA (US)

(72) Inventors: Lixia Yan, Basking Ridge, NJ (US); Imtiaz Shaikh, Irving, TX (US); Barry F. Hoffner, Bridgewater, NJ (US); Ho Yin Cheuk, Hoboken, NJ (US); Marc Chiaverini, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,474

(22) Filed: Nov. 13, 2018

(65) Prior Publication Data

US 2019/0082056 A1   Mar. 14, 2019

Related U.S. Application Data

(63) Continuation of application No. 15/639,219, filed on Jun. 30, 2017, now Pat. No. 10,171,682.

(51) Int. Cl.
| | |
|---|---|
| *H04W 4/24* | (2018.01) |
| *H04M 15/00* | (2006.01) |
| *H04L 12/14* | (2006.01) |
| *H04W 12/00* | (2009.01) |
| *H04W 12/08* | (2009.01) |
| *H04W 4/70* | (2018.01) |

(52) U.S. Cl.
CPC ........ *H04M 15/80* (2013.01); *H04L 12/1407* (2013.01); *H04M 15/66* (2013.01); *H04W 4/24* (2013.01); *H04W 12/00502* (2019.01); *H04W 12/00514* (2019.01); *H04W 12/0808* (2019.01); *H04W 4/70* (2018.02)

(58) Field of Classification Search
CPC .......... H04M 15/80; H04W 4/24; H04W 4/70
See application file for complete search history.

(56) References Cited

U.S. PATENT DOCUMENTS

| | | | |
|---|---|---|---|
| 10,171,682 B1 * | 1/2019 | Yan | H04W 4/24 |
| 2011/0035430 A1 | 2/2011 | Hayward | |
| 2017/0289898 A1 * | 10/2017 | Youn | H04W 48/14 |
| 2017/0311304 A1 * | 10/2017 | Lu | H04W 4/70 |
| 2017/0359768 A1 | 12/2017 | Byun et al. | |
| 2018/0198867 A1 | 7/2018 | Dao et al. | |
| 2018/0227826 A1 | 8/2018 | Abraham et al. | |
| 2018/0227842 A1 | 8/2018 | Chandramouli et al. | |
| 2018/0227873 A1 | 8/2018 | Vrzic et al. | |
| 2019/0007560 A1 * | 1/2019 | Yan | H04W 4/24 |
| 2019/0082056 A1 * | 3/2019 | Yan | H04W 4/24 |

* cited by examiner

*Primary Examiner* — Benjamin H Elliott, IV (57) ABSTRACT

A method is provided for performing RAN-usage-based tracking in a wireless core network. The method includes obtaining a plan code for a communication device connecting to a radio access network (RAN); associating, based on the plan code, the communication device with a RAN-usage-based plan; and reporting, after the associating, a tracking instance of RAN usage by the communication device.

20 Claims, 10 Drawing Sheets

NETWORK INTERFACE FOR TRACKING RADIO RESOURCE UTILIZATION

CROSS REFERENCE TO RELATED APPLICATION

This application is a continuation of U.S. patent application Ser. No. 15/639,219 filed on Jun. 30, 2017, the disclosure of which is hereby incorporated by reference.

BACKGROUND

Internet of Things (IoT) technology refers to a wide range of devices that can collect and forward data. The IoT devices may be configured to transfer the data via a cellular network. Since IoT technology has nearly limitless applications that can be leveraged to form new and useful services, interest among service providers and developers in IoT technology continues to increase. Supporting the growing number of connection requests and volume of data from IoT technology presents a significant challenge for providers of network services. Particularly, many IoT communications are characterized by infrequent, small-data transactions. While IoT devices individually may constitute a small load on the network, the overall effect of these devices can burden network resources.

DETAILED DESCRIPTION OF PREFERRED EMBODIMENTS

The following detailed description refers to the accompanying drawings. The same reference numbers in different drawings may identify the same or similar elements.

Today, mobile service plans commonly track data usage by a device (e.g., a 2 GB, 5 GB, or "unlimited" monthly data plan). These models do not correlate well to IoT communications that usually initiate periodic network connections with nominal data usage. IoT customers in the data-based plans may be accountable for unnecessary data, while service providers have to support a disproportionate amount of small data sessions.

Standards for future wireless core networks, including Third Generation Partnership Project (3GPP) 5G network standards, are being developed to support new data use cases. One area of future standards development includes optimized connectivity for sporadic data transmissions, such as data transmissions characterized by IoT communications (also referred to as machine-type communications). As these standards are being developed, architectural changes may be put in place to support radio-connectivity-based tracking in wireless core networks.

Systems and methods described herein provide systems suitable for operators to monitor and control IoT devices. Network architecture and interfaces are provided to enable tracking customer network use based on per-device radio resource utilization, irrespective of data usage. For example, depending on a service plan selected by a customer, use of consumer devices may be tracked based on a number of RAN attachments, total RAN attachment duration, or other RAN connection parameters.

Figure 1:
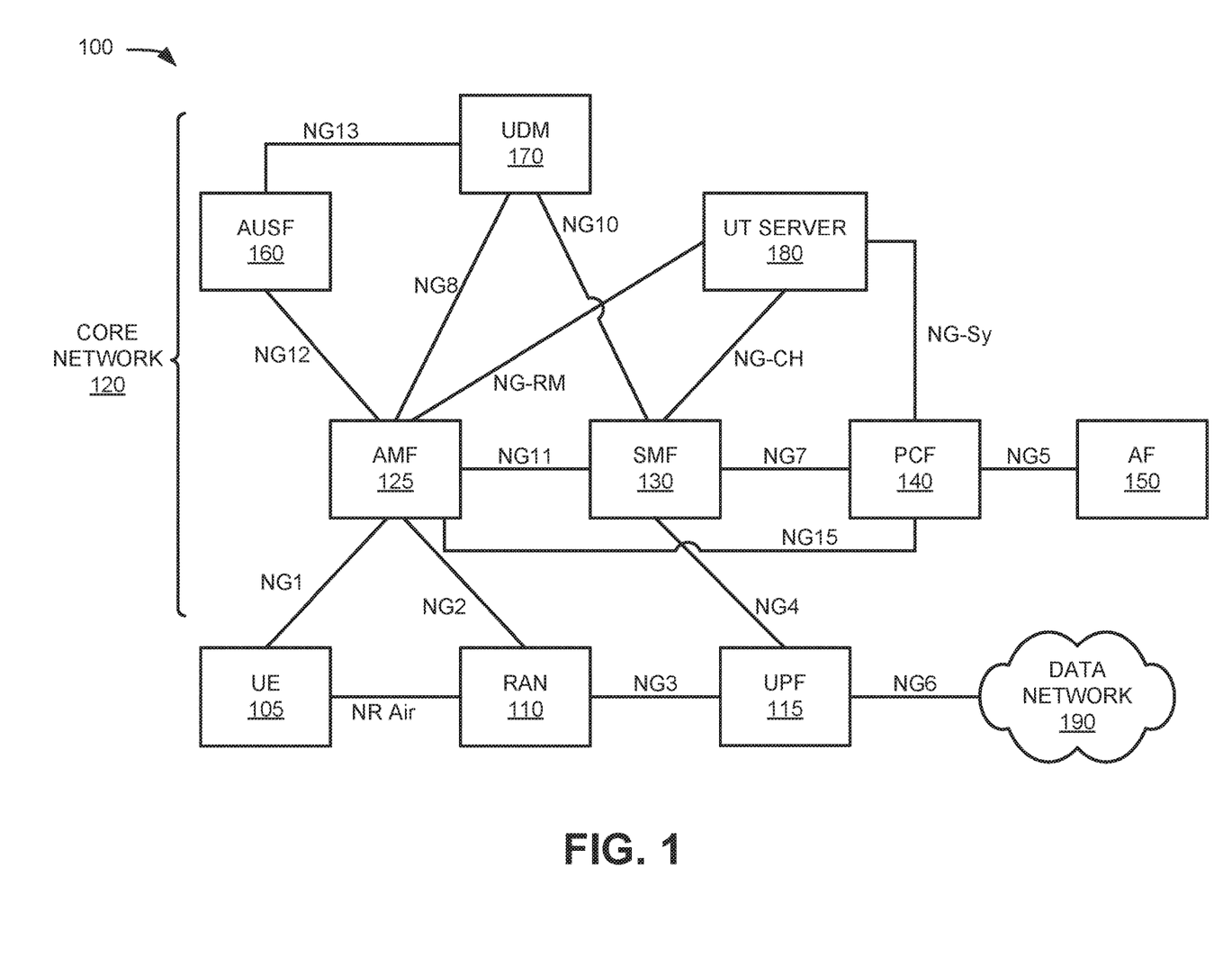
FIG. 1 is a diagram illustrating an exemplary network environment according to an implementation described herein.

FIG. 1 is a diagram illustrating an exemplary network environment 100 in which systems and methods described herein may be implemented. As illustrated, network environment 100 may include user equipment (UE) 105, a radio access network (RAN) 110, a user plane function (UPF) device 115, a wireless core network 120, and a data network 190. The descriptions herein of network environment 100 generally references terminology and architecture from developing 3GPP 5G standards. However, other network standards and architectures may be used.

UE 105 may include a communication device (e.g., a mobile phone, a smart phone, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication and output capabilities.

In some implementations, UE 105 may correspond to an IoT device or an embedded wireless device that communicates wirelessly with other devices over a machine-to-machine (M2M) interface. For example, UE 105 may be electrically connected to any electronic device with a microcontroller, such as a microcontroller controlling one or more actuators, a microcontroller controlling one or more sensors, a microcontroller that performs data processing, and/or another type of electronic device with a microcontroller. Non-limiting examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), smart home devices (e.g., security cameras, sensors, thermostats, etc.) and/or another type of electronic device. In some cases, UE 105 may be designed to perform a particular set of limited functions and, thus, may be referred to as a resource constrained device.

According to an exemplary embodiment, UE 105 includes a communication interface via which UE 105 can transmit and receive data. According to an exemplary embodiment, the communication interface includes a wireless modem that supports broadband mobile communications with RAN 110. In a 5G network architecture, UE 105 may connect to AMF device 125 via an NG1 interface and to RAN 110 via an NR air interface.

RAN 110 includes one or multiple networks of one or multiple types to connect UE 105 to components of network environment 100, including connections to UPF device 115 and AMF device 125. RAN 110 may be a 3rd Generation (3G) RAN, a Fourth Generation (4G) RAN, a 4.5G RAN, a 5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. RAN 110 may include a wired network. For example, access network 105 may include an optical network or a cable network. RAN 110 may connect to UPF 115 via an NG3 interface and to AMF device 125 via an NG2 interface. These and other interfaces described herein may be implemented using certain protocols such as, for example, a Diameter protocol.

UPF device 115 (also referred to simply as UPF 115) may include one or more network elements to process user plane data. UPF 115 may connect to SMF device 130 via an NG4 interface and to data network 190 via an NG6 interface.

Core network 120 may include network elements according to developing 3GPP 5G network standards. Core network 120 may include, for example, an access and mobility management function (AMF) device 125, a session management function (SMF) device 130, a policy control function (PCF) device 140, an application function (AF) device 150, an authentication server function (AUSF) device 160, a unified data management (UDM) device 170. In addition, a usage-tracking (UT) server 180 may be included within or in communication with core network 120.

AMF device 125 (also referred to simply as AMF 125) may include one or more network devices to provide common access control and mobility management (MM) functions for all accesses. AMF 125 maintains UE 105's MM state, UE 105's mobility pattern and restriction policies, etc. AMF 125 connects to SMF device 130 via an NG11 interface, to AUSF device 160 via an NG12 interface, and to UDM 170 via an NG8 interface. As described further herein, AMF 125 communicates with UT server 180 via a new tracking interface, referred to herein as an NG-RM interface. In one implementation, the NG-RM interface may be a dedicated interface for exchanging data and related controls between AMF 125 and tracking server 180.

SMF device 130 (also referred to simply as SMF 130) may include one or more network devices to provide session management separate from MM functions of AMF 125. For example, SMF 130 collects data usage for UE 105 sessions (e.g., with devices/applications in data network 190). SMF 130 connects to PCF device 140 via an NG7 interface and to UDM 170 via an NG10 interface. SMF may communicate with UT server 180 via an NG-CH interface.

PCF device 140 (also referred to simply as PCF 140) may include one or more network devices to provide policy control decision functionalities. PCF 140 may provide network control regarding service data flow detection, gating, quality of service (QoS) and flow based charging, etc. PCF 140 may determine how a certain service data flow shall be treated, and may ensure that traffic mapping and treatment is in accordance with a user's subscription profile. PCF 140 communicates with AMF 125 via an NG15 interface, SMF 130 via the NG7 interface, and AF 150 via an NG5 interface.

AF device 150 (also referred to simply as AF 150) may include one or more network devices to provide applications, data, and/or services to UE 105. In one example implementation, AF 150 may host a website from which UE 105 can receive applications, data, and/or services. In another example, AF 150 may be a content delivery server or provide location-based services. AF 150 may communicate with PCF 140 via the NG5 interface.

AUSF device 160 (also referred to simply as AUSF 160) may include one or more network devices that manage permissions for UE 105. For example, AUSF 160 may verify that a UE 105 is authorized to access particular types of network services. AUSF 160 may communicate with AMF 125 via the NG12 interface and with UDM 170 via an NG13 interface.

UDM 170 may include one or more network devices that store user data. For example, UDM 170 may store subscription data, policy data (e.g., on quality of service and charging), and session related context (e.g., UE 105 location), in a unified data layer. UDM 170 may communicate with AMF 125 via the NG8 interface, with SMF 130 via the NG10 interface, and with AUSF via the NG13 interface.

UT server 180 may include one or more network devices. In one implementation, UT server 180 may provide a service plan code to AMF 125 to allow AMF 125 to determine when (e.g., for which UE 105) to provide UE-RAN connection data (e.g., resource control (RRC) connection data or similar data). For each UE 105 under a RAN-usage-based plan, UT server 180 may receive mobility management (MM) state data from AMF 125. In one implementation, UT server 180 may store control parameters for each service plan and track actual usage values (e.g., number of connections, duration of connections, MM state data, etc.) against the control parameters. When a control parameter is exceeded, UT server 180 may initiate action to control/limit UE 105 connections to RAN 110 for a period of time. In another implementation, UT server 180 may log actual usage values to provide to a billing entity.

Data network 190 may include one or multiple networks of one or multiple types. For example, data network 190 may be implemented as an IP network, the Internet, an IMS network, a service or application-layer network, a proprietary network, a cloud network, a data network, etc.

In the example of FIG. 1, network elements and networks may be connected by links using protocols for different interfaces (e.g., interface NG1, NG2, etc.). A network element may transmit and receive data via a link. Environment 100 may be implemented to include wireless and/or wired (e.g., electrical, optical, etc.) links. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple RANs 110, UPFs 115, AMFs 125, and so forth. Additionally, or alternatively, according to other embodiments, multiple network elements may be implemented on a single device, and conversely, a network element may be implemented on multiple devices. In other embodiments, one network in environment 100 may be combined with another network.

Figure 2:
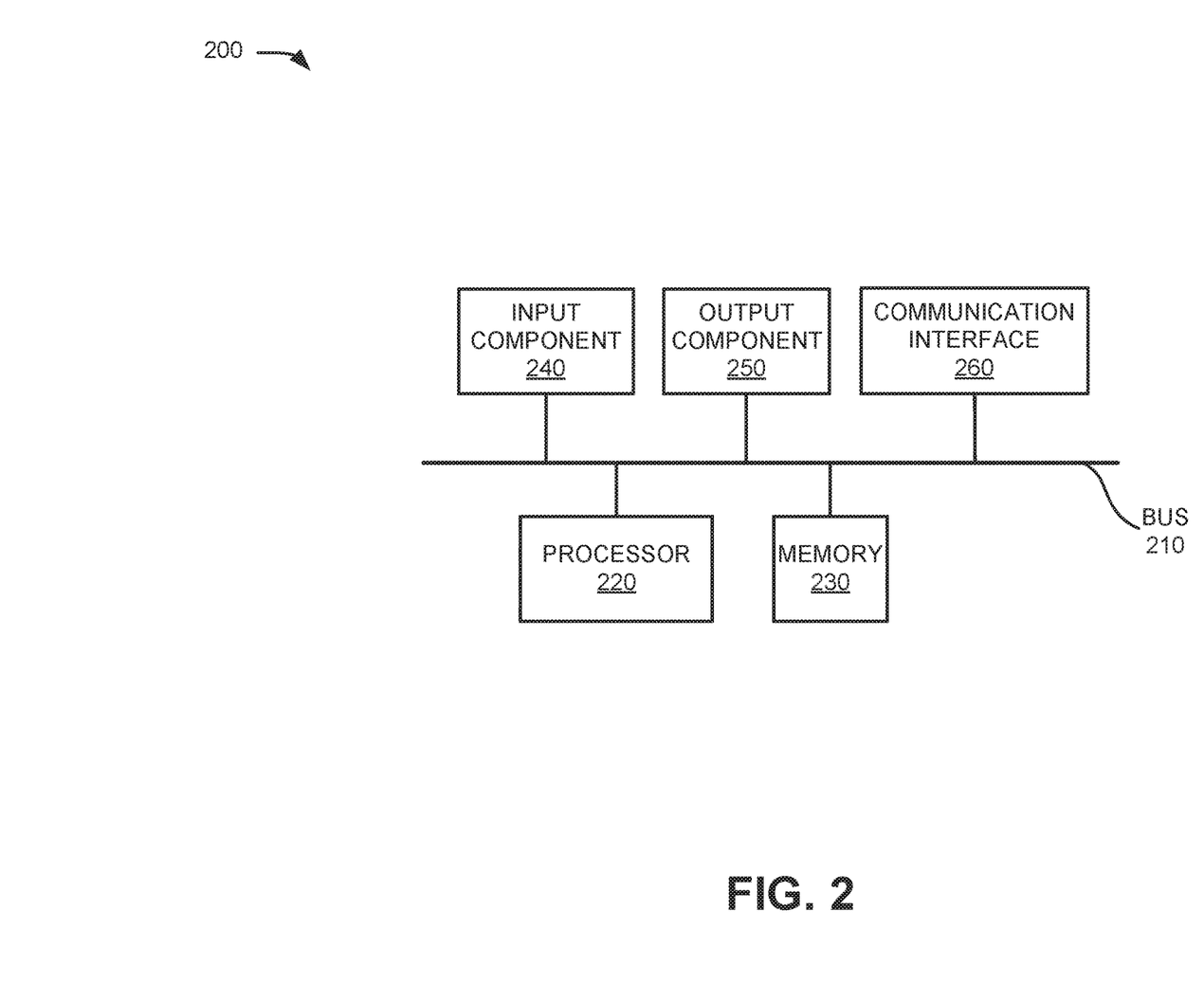
FIG. 2 is a diagram illustrating exemplary components of a device that may be included in a device of FIG. 1.

FIG. 2 is a diagram illustrating exemplary components of a device 200. Device 200 may correspond, for example, to a component of UE 105, UPF 115, AMF 125, SMF 130, PCF 140, AF 150, AUSF 160, UDM 170, UT server 180, or another component of network environment 100. Device 200 may include a bus 210, a processor 220, a memory 230, an input component 240, an output component 250, and a communication interface 260.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of radio frequency (RF) signals. For example, communication interface 260 may include one or more antennas to transmit and/or receive RF signals over the air. Communication interface 260 may, for example, receive RF signals and transmit them over the air to UE 105/RAN 110, and receive RF signals over the air from RAN 110/UE 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3:
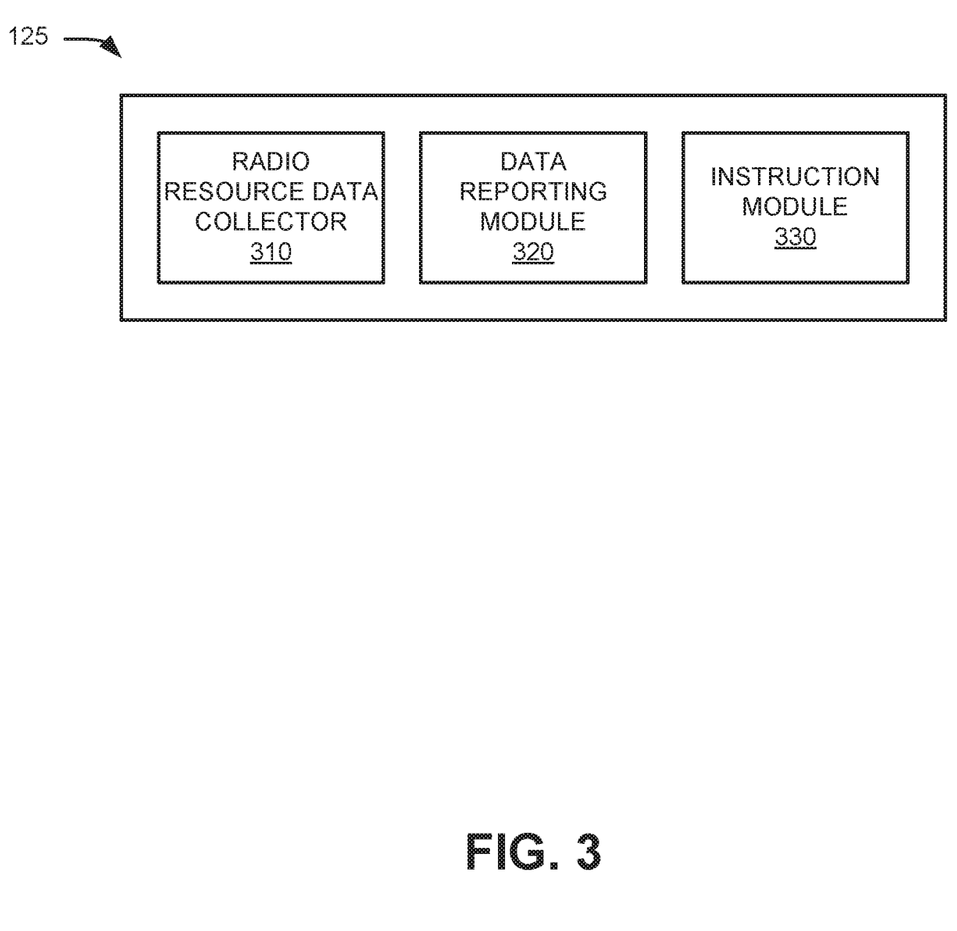
FIG. 3 is a diagram illustrating exemplary logical components of the access and mobility management function (AMF) of FIG. 1.

FIG. 3 is a diagram illustrating exemplary logical components of AMF 125 according to an implementation described herein. The functional components of AMF 125 may be implemented, for example, via processor 220 executing instructions from memory 230 or via hardware. As shown in FIG. 3, AMF 125 may include a radio resource data collector 310, a data reporting module 320, and an instruction module 330.

Radio resource data collector 310 may collect and update RAN access and mobility status of UEs 105. For example, radio resource data collector 310 may maintain a mobility management (MM) state for each UE 105. An MM state may include an RM-deregistered state or an RM registered state, with the RM-registered state including a CM-idle state or a CM-connected state. Radio resource data collector 310 may also track non-access stratum (NAS) signaling, such as a protocol data unit (PDU) request from UE 105. Radio resource data collector 310 may further track mobility restrictions and mobility patterns for a UE 105.

Data reporting module 320 may report UE data/changes from radio resource data collector 310 to UT server 180 using, for example, the NG-RM interface of FIG. 1. In one implementation, data reporting module 320 may obtain from UDM 170 a service plan associated with UE 105. For example, UDM 170 may provide a UE service plan indicator to AMF 125 whenever UE 105 requests permission to connect to RAN 110. The service plan indicator may direct a type of charging to be used for UE 105. Types of charging may include data-usage-based plans or RAN-usage-based plans. When the service plan indicator for UE 105 indicates a RAN-usage-based plan, data reporting module 320 may provide UE 105's RAN-usage parameters (as collected by radio resource data collector 310) to UT server 180 for support of radio connectivity-based, resource-based, or mobility-related charging and control. In one implementation, the RAN-usage parameters may be provided from AMF 125 to UT server 180 in real-time or near-real-time (e.g., within 500 milliseconds). In another implementation, the RAN-usage parameters may be provided from AMF 125 to UT server 180 as a batch process at timed intervals (e.g., up to one-minute intervals, etc.)

Instruction module 330 may receive control signals initiated by UT server 180 to maintain UE 105 in conformance with a service plan, such as a RAN-usage-based plan. For example, in one implementation, instruction module 330 may receive an indication that UE 105 has exceeded a number of allotted RRC connections per day or another monitor MM state. In response, instruction module 330 may send a signal to UE 105 (e.g., directly via interface NG1 or indirectly via interface NG2) to control/limit UE 105 signaling (e.g., for the remainder of that day). In another implementation, instruction module 330 may send a signal to another network element (e.g., RAN 110, AUSF 160) to enforce controls on UE 105 signaling in accordance with a service plan. In still another implementation, instruction module 330 may enforce instructions, received from UT server 180, for compliance with a service plan for UE 105.

Although FIG. 3 shows exemplary logical components of AMF 125, in other implementations, AMF 125 may include fewer logical components, different logical components, or additional logical components than depicted in FIG. 3. Additionally or alternatively, one or more logical components of may perform functions described as being performed by one or more other logical components.

Figure 4A:
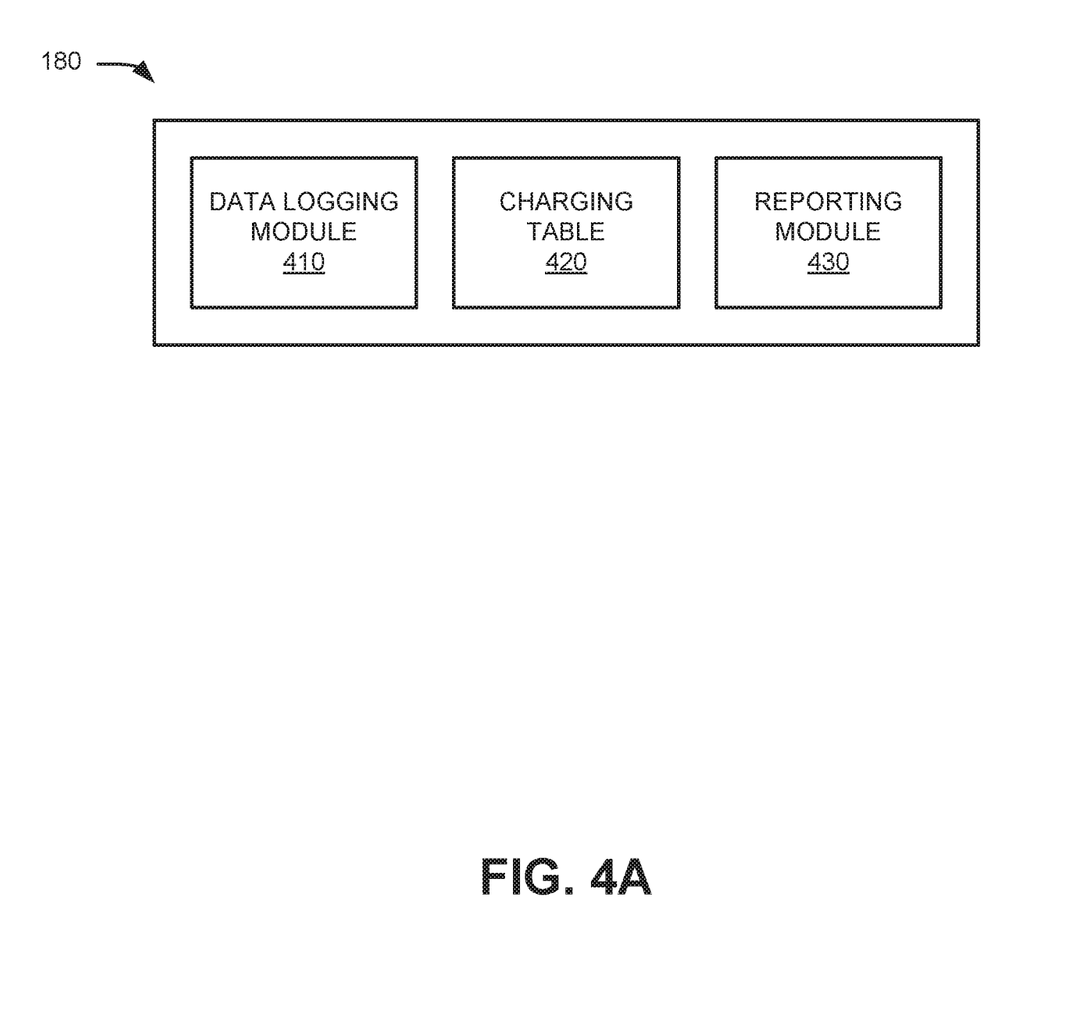
FIGS. 4A and 4B are diagrams illustrating exemplary logical components of the usage-tracking server of FIG. 1.

FIG. 4A is a diagram illustrating exemplary logical components of UT server 180 according to an implementation described herein. The functional components of UT server 180 may be implemented, for example, via processor 220 executing instructions from memory 230. As shown in FIG. 4A, UT server 180 may include a data logging module 410, a charging table 420, and a reporting module 430.

Data logging module 410 may store service plan information for each UE 105 and log corresponding RAN-usage parameters received from data reporting module 320. In one implementation, data logging module may use charging table 420 or another data structure to track that UE 105 behavior is in accordance with an assigned service plan for the UE 105.

Figure 4B:
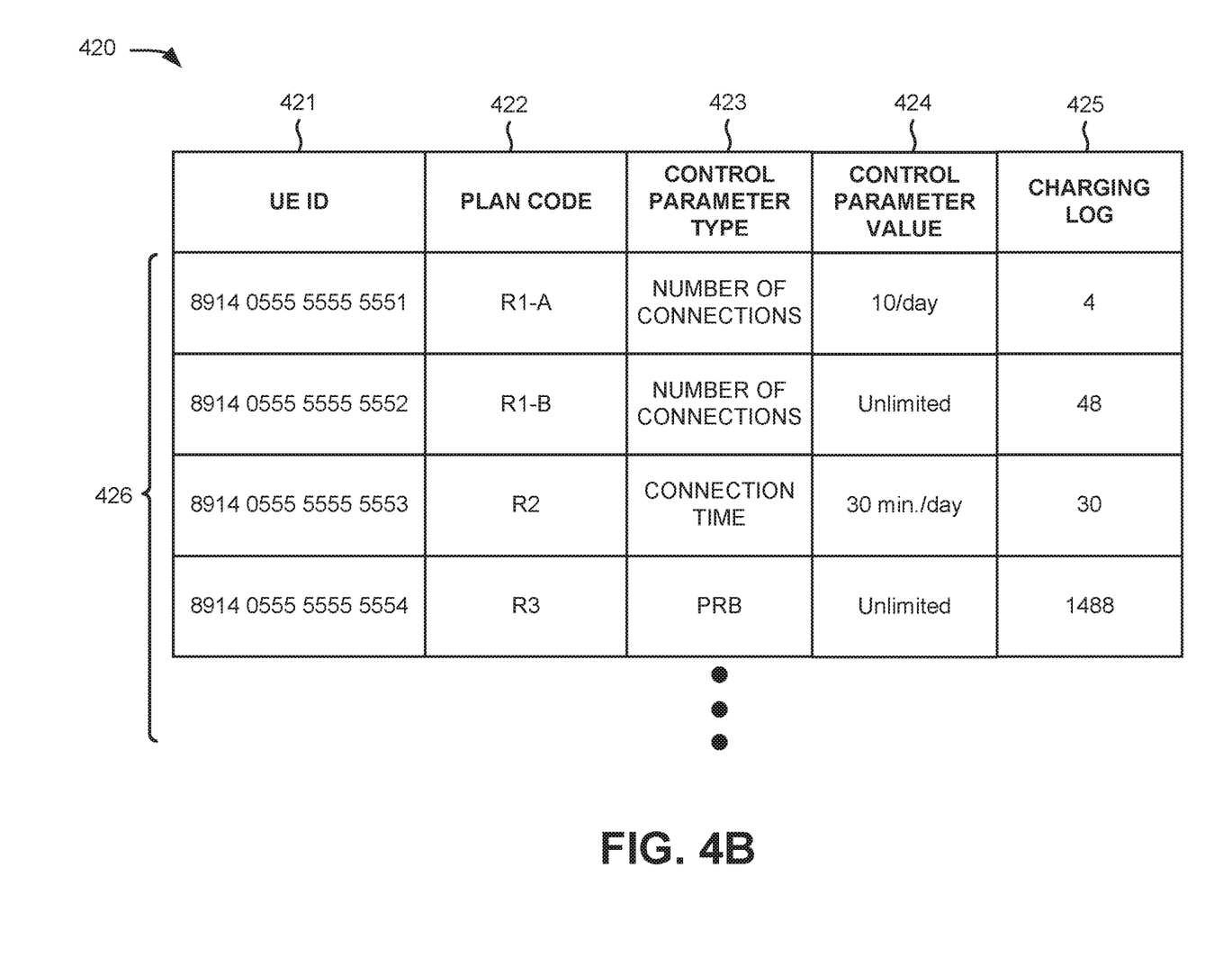

FIG. 4B provides a simplified example of charging table 420. As shown in FIG. 4B, charging table 420 may include a UE identifier (ID) field 421, a plan code field 422, a control parameter type field 423, a control parameter value field 424, a charging log field 425, and a variety of entries 426 associated with each of fields 421-425. Values for entries 426 in fields 421-424 may be obtained by data logging module 410 from subscriber profile data, which may be provisioned directly to UT server 180 or obtained from another network entity (e.g., UDM 170). Values for entries 426 in field 425 may be received from AMF 125 (e.g., via an NG-RM interface) and updated in real time.

UE ID field 421 may include a unique identifier for unique identifier for a particular UE 105. For instance, UE ID field 421 may include a mobile directory number (MDN), a mobile identification number (MIN), a mobile equipment identity (MEID), an international mobile equipment identity (IMEI), an International Mobile Subscriber Identity (IMSI), etc.

Plan code field 422 may include a service plan code associated with the UE ID of field 421. For example, plan code field may include a service plan code obtained from a subscriber profile for UE 105. Plan code field 422 may indicate, for example, a type of RAN-usage-based plan for UE 105. In the simplified illustration of FIG. 4B, plan codes "R1-A" and "R1-B" may correspond to subscriber plans that allow a fixed number of connections per time period (e.g., for M2M-type reporting), plan code "R2" may correspond to a subscriber plan that allows a fixed number of connected minutes per time period, and plan code R3 may correspond to a subscriber plan that allows for transmission of a up to a fixed number of physical resource blocks (PRBs) per time period.

Control parameter type 423 may include one or more parameters corresponding to plan code field 422. For example, plan code "R1-A" may indicate that a parameter for number of connections (e.g., RRC connections) by UE 105 will be monitored. Similarly, plan code "R2" may indicate that a parameter for a total connection time by UE 105 will be monitored.

Control parameter value field 424 may include one or more parameter values for a corresponding parameter type in plan code field 423. For example, plan code "R1-A" may be assigned a control parameter value of 10 connections per day; plan code "R1-B" may be assigned a control parameter value of unlimited connections per day; and plan code "R2" may be assigned a control parameter value of 30 minutes per day. As shown, for example, in connection with plan code "R3," some plans may have unlimited control parameter values (e.g., where charges accrued based on total use).

Charging log field 425 may include a dynamic count/total for UE 105 corresponding to control parameter type field 423. Entries 426 in charging log field 425 may be updated based on data provided by AMF 125 (e.g., data reporting module 320).

Returning collectively to FIGS. 4A and 4B, reporting module 430 may monitor entries in charging table 420 and generate a report when a control parameter is exceeded for a UE 105. For example, reporting module 430 may report that UE 105 with UE ID "8914 0555 5555 5553" in table 420 has reached the daily 30-minute connection time limit for service plan "R2." In one implementation, reporting module 430 may generate a message (e.g., indicating an account limit has been reached) to be delivered to a subscriber/account holder. In another implementation, reporting module 430 may generate a message to a network entity, such as AMF 125 (e.g., instruction module 330), to control/limit activity by the over-extended UE 105. Thus, reporting module 430 may use the new NG-RM interface between AMF 125 and UT server 180 may pass instructions to AMF 125 for radio connectivity-based, resource-based, or mobility-related charging and control.

Figure 5:
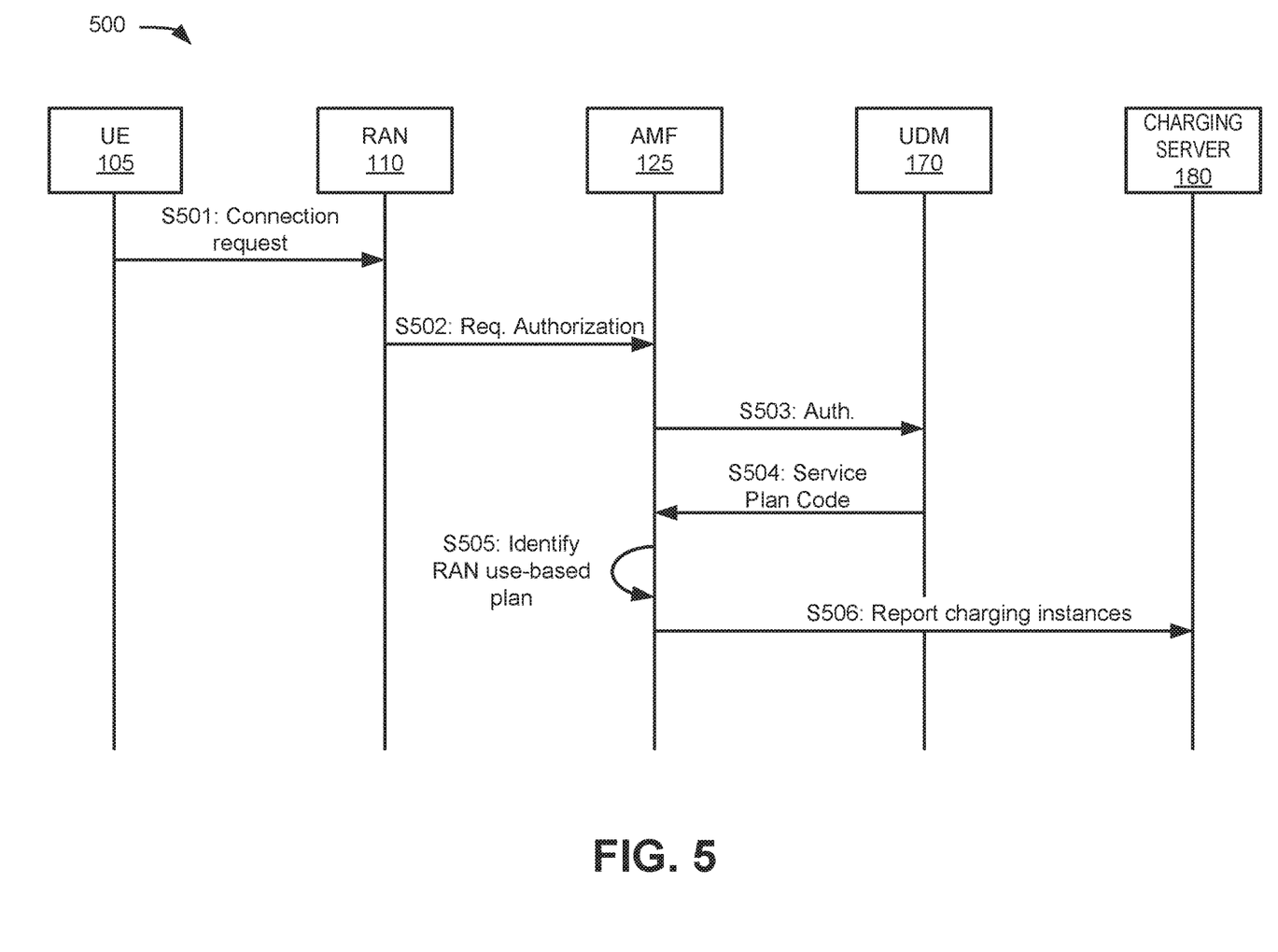
FIG. 5 is an exemplary signal flow diagram for logging radio resource use according to an implementation described herein.

FIG. 5 is a signal flow diagram for logging radio resource use in a portion 500 of network environment 100. As shown in FIG. 5, network portion 500 may include UE 105, RAN 110, AMF 125, UDM 170, and UT server 180.

As shown in FIG. 5, at signal S501 UE 105 may provide a connection request to RAN 110. A network device (e.g., a base station, eNode B, or the like) in RAN 110 may receive the connection request and, at signal S502, may request authorization for UE 105 to attach to the network. AMF 125 may conduct authentication and authorization procedures, which may include forwarding an authorization request to UDM 170 at step S503, and obtaining subscription data from UDM 170 including a service plan code at signal S504. The service plan code may indicate that the code is for a RAN-usage-based plan.

Assuming the service plan code indicates a RAN-usage-based plan for UE 105, AMF 125 may receive the service plan code and identify that the code is for a RAN-usage-based plan in signal S505. Based on the identification, AMF 125 may begin reporting charging instances for UE 105 to UT server 180 at signal S506. For example, AMF 125 may send to UT server 180 indications of MM state changes for UE 105 (e.g., MM de-registers, MM registered with idle state, MM registered with connected state, etc.), NAS signaling by UE 105 (e.g., PDU requests), or mobility restrictions/mobility pattern data for UE 105. In one implementation, UT server 180 may receive the charging instances for UE 105 and update an entry in a corresponding charging log field 425 of charging table 420.

Figure 6A:
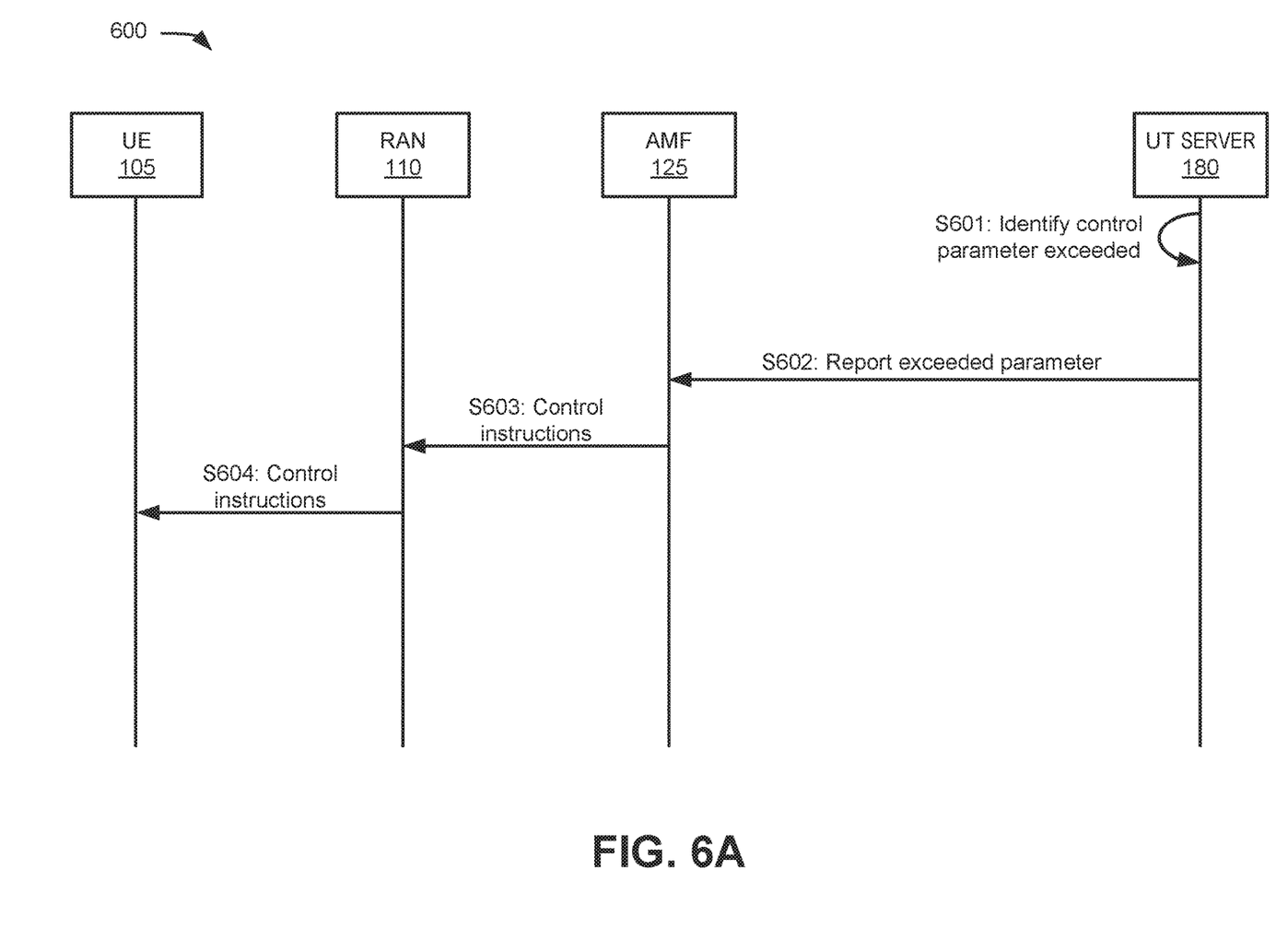
FIGS. 6A and 6B are exemplary signal flow diagrams for controlling user equipment (UE) behavior based on radio resource use, according to implementations described herein.
Figure 6B:
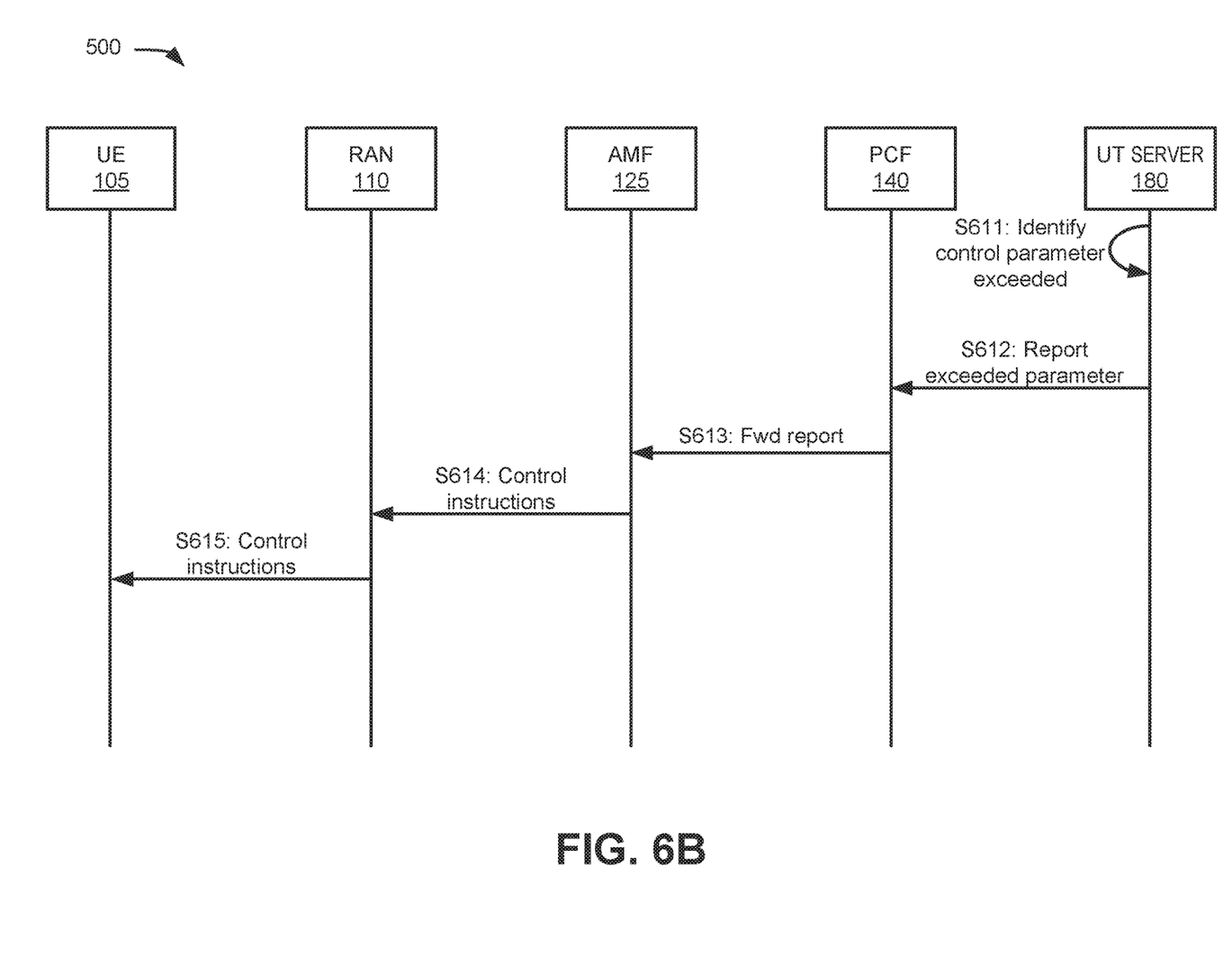

FIGS. 6A and 6B are signal flow diagrams for controlling UE behavior based on radio resource use, according to implementations described herein. Referring to FIG. 6A, a network portion 600 may include UE 105, RAN 110, AMF 125, and UT server 180. Signals for controlling UE behavior based on radio resource use may be transmitted through network portion 600 using the NG-RM interface.

As shown in FIG. 6A, at signal S601 UT server 180 may identify that a control parameter is exceeded for a UE 105. For example, based on a comparison of entries for charging log field 425 and control parameter value field 424, UT server 180 may determine that UE 105 has reach a subscription limit for RAN use (e.g., a number of daily connections, a total connection time limit, etc.). Upon identifying that the control parameter was exceeded, UT server 180 may report to AMF 125 (e.g., via the NG-RM interface) that a control parameter has been exceeded at signal S602. Additionally, or alternatively, UT server 180 may provide instructions for controlling or limiting UE 105 behavior to conform to subscription policies.

AMF 125 may receive the report/instructions from UT server 180 and, in response, may generate and/or forward control instructions to RAN 110 via signal S603. RAN 110 may receive the control instructions. In one implementation, RAN 110 may implement the instructions to control/limit RAN activity by UE 105. In another implementation, RAN 110 may forward the instructions in signal S604 to UE 105 for local implementation in accordance with the subscriber's RAN-usage-based plan.

Referring to FIG. 6B, a network portion 610 may include UE 105, RAN 110, AMF 125, PCF 140, and UT server 180. In the example of FIG. 6B, signals for controlling UE behavior based on radio resource use may be transmitted through a network portion 610 without using the NG-RM interface from UT server 180 to AMF 125. Similar to signal S601 of FIG. 6A, signal S611 of FIG. 6B may identify that a control parameter is exceeded for a UE 105. Upon identifying that the control parameter was exceeded, UT server 180 may report to PCF 140 (e.g., via interface NG15) that a control parameter has been exceeded at signal S612. Additionally, or alternatively, UT server 180 may provide instructions for controlling or limiting UE 105 behavior to conform to subscription policies. PCF 140 may receive the report/instructions from UT server 180 and may forward the report/instructions to AMF 125 as signal S613.

AMF 125 may receive the report/instructions from PCF 140 and, in response, may generate and/or forward control instructions to RAN 110 via signal S614. RAN 110 may receive the control instructions. RAN 110 may implement the instructions to control/limit RAN activity by UE 105 or forward the instructions in signal S615 to UE 105 for local implementation in accordance with the subscriber's RAN-usage-based plan.

Figure 7:
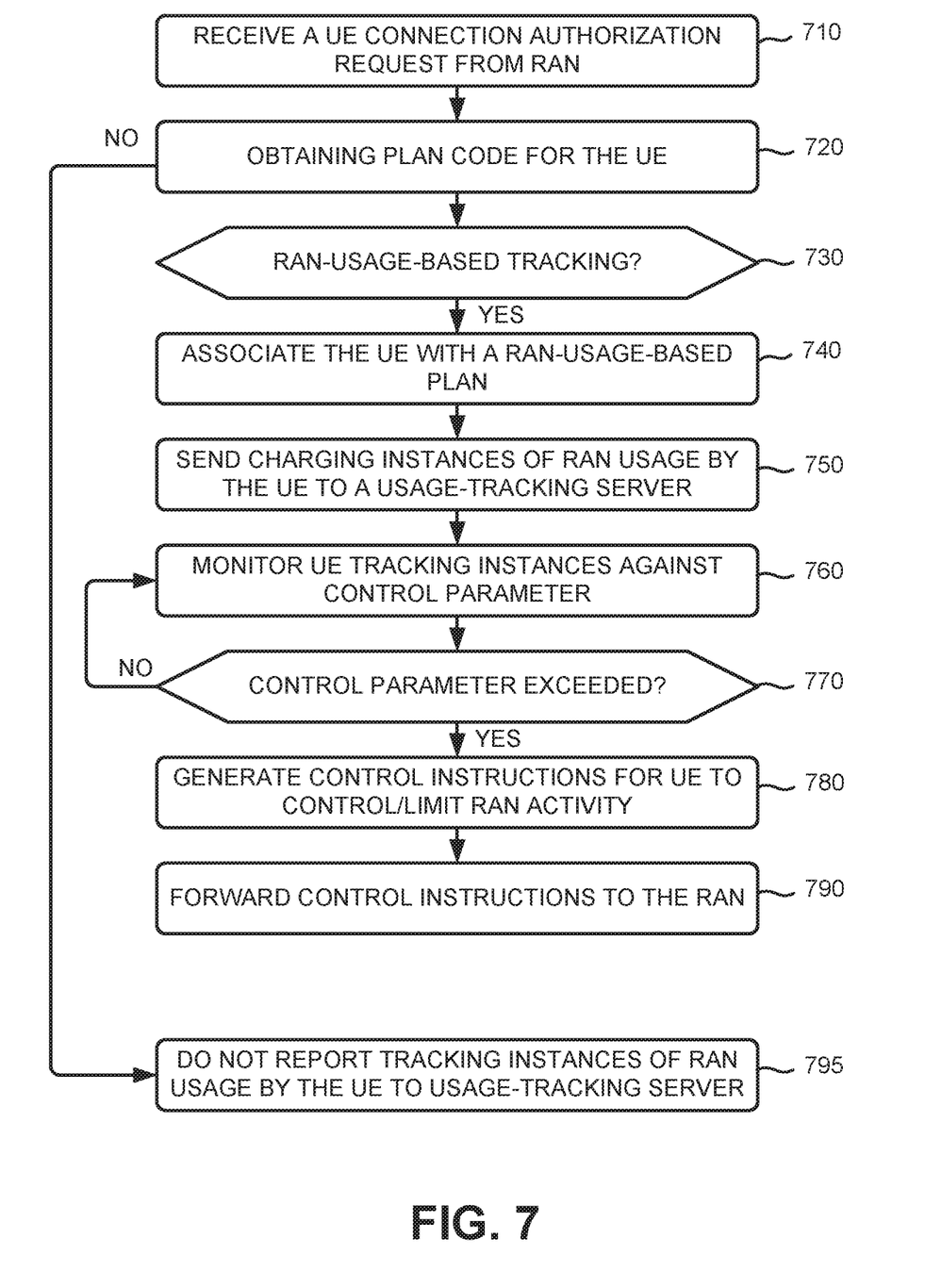
FIG. 7 is a flowchart of a process for tracking radio resource utilization according to an implementation described herein.

FIG. 7 is a flow diagram illustrating an exemplary process 700 for tracking charges based on radio resource utilization, according to an implementation described herein. In one implementation, process 700 may be performed by AMF 125 and UT server 180. In another implementation, some or all of process 700 may be performed by another device or group of devices in network environment 100.

As shown in FIG. 7, process 700 may include receiving a UE connection authorization request from a RAN (block 710) and obtaining a plan code for the UE (block 720). For example, as described in FIG. 5, UE 105 may provide a connection request to RAN 110. A network device (e.g., a base station, eNode B, or the like) in RAN 110 may receive the connection request and request authorization for UE 105 to attach to the network. AMF 125 may forward an authorization request to UDM 170 and obtain subscription data from UDM 170 including a service plan code.

Process 700 may also include determining, based on the service plan code, if the UE requires RAN-usage-based tracking (block 730). For example, the plan code AMF 125 receives from UDM 170 may indicate that UE 105 is using radio-connectivity-based charging.

If the UE requires RAN-usage-based tracking (block 730—Yes), process 700 may include associating, based on the plan code, the UE with a RAN-usage-based plan (block 740) and sending, in response to the associating, MM state changes by the UE to a tracking server device (block 750). For example, based on the plan code, AMF 125 may determine that MM state change information for UE 105 must be forwarded to UT server 180. In one implementation, indications of state changes may be provided via the NG-RM interface between AMF 125 and UT server 180.

Process 700 may additionally include monitoring the UE tracking instances against a control parameter (block 760) and identifying if a control parameter for the service plan code is exceeded (block 770). For example, for each UE 105 under a RAN-usage-based service plan, UT server 180 may receive MM state data from AMF 125. UT server 180 may track actual usage values received from AMF 125 (e.g., number of connections, duration of connections, etc.) against control parameters for a corresponding UE service plan. UT server 180 may determine when usage by UE 105 meets or exceeds a control parameter.

If a control parameter for the service plan code is exceeded (block 770—Yes), process 700 may include generating control instructions for the UE to control/limit RAN activity (block 780), and forwarding the control instructions to the RAN (block 790). For example, when a control parameter is exceeded, UT server 180 may initiate action to control/limit UE 105 connections for a period of time. UT server 180 may send control instructions to AMF 125, which may in turn forward a back-off timer value to UE 105 (either directly or via a base station in RAN 110) to limit future connection attempts within the controlled period.

Returning to block 730, if the UE does not require RAN-usage-based tracking (block 730—No), process 700 may include not reporting tracking instances of RAN usage by the UE to the usage-tracking server device (block 795). For example, if radio-connectivity-based tracking is not applicable to UE 105, AMF 125 may not forward MM state data for UE 105 to UT server 180. In such instances, tracking data may be collected and forwarded by other network elements in core network 120. For example, data usage amounts may be tracked by other network elements.

Figure 8:
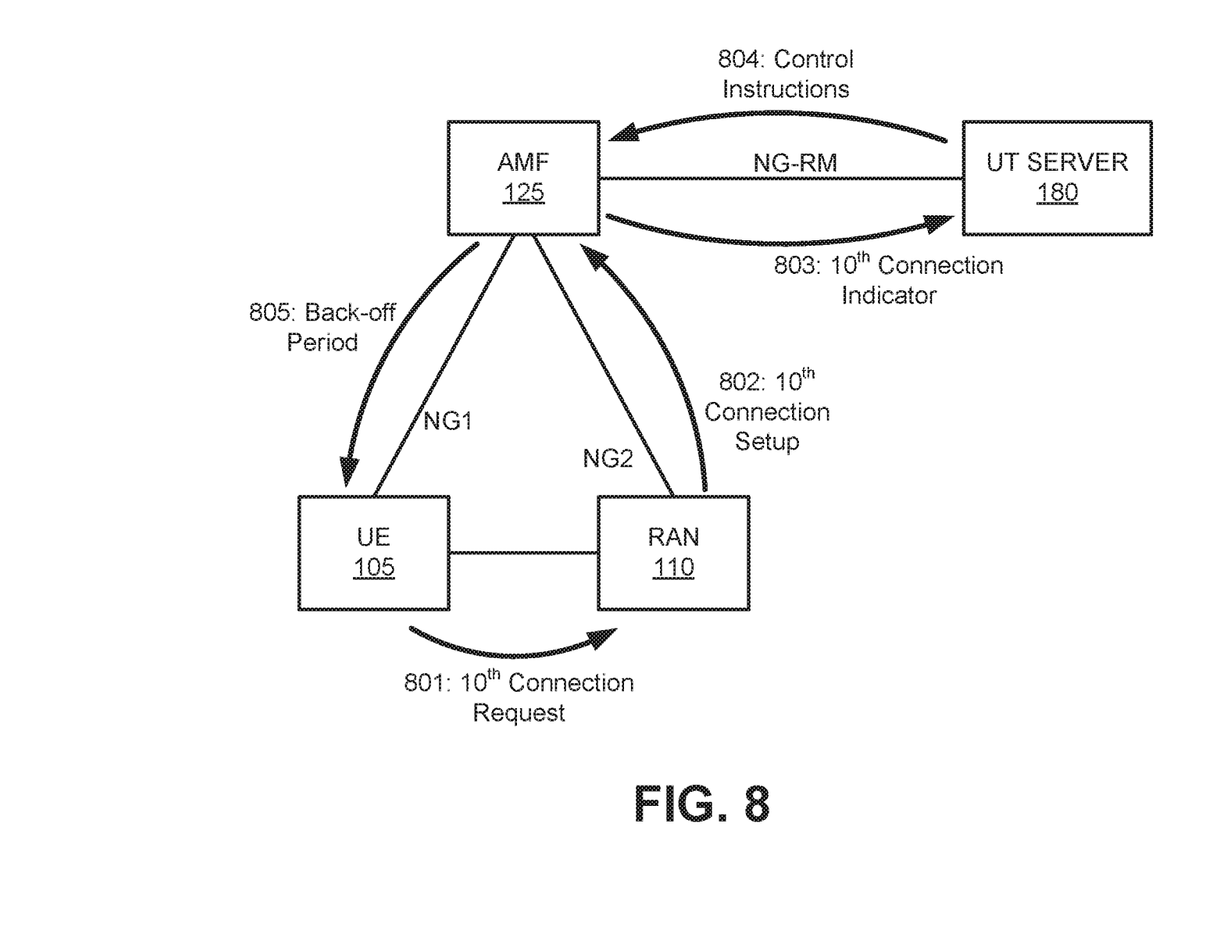
FIG. 8 is a diagram illustrating use cases according to an implementation described herein.

FIG. 8 is a diagram of a use case for controlling charges based on radio resource utilization, according to an implementation. With broadband cellular communications, the radio network is typically the most expensive resource. Radio-connectivity-based tracking will allow operators to offer subscription pricing based on radio resource utilization. For example, connections and/or connection times logged by UT server 180 could simply be charged on a per-connection or per-minute basis. However, radio-connectivity-based tracking will also provide a way for operators to monitor and control UE 105 behavior by limiting the radio resource connection duration or by limiting the number of times device is allowed to attach to a RAN per cycle (e.g., an hour, a day, a week, etc.).

As described above, AMF 125 maintains UE's 105 MM status and terminates NAS signaling with UE 105 directly via the NG1 interface. AMF 125 interfaces with RAN 110 to setup a radio resource for UE 105 via the NG2 interface. Radio-connectivity-based tracking may be implemented via the NG-RM interface between AMF 125 and UT server 180. Each time UE 105 connects to RAN 110, AMF 125 may identify pricing structure for UE 105 as radio-connectivity-based charging and report the connections to UT server 180.

Assume in FIG. 8 that UE 105 is an IoT device with a service plan for 10 RAN connections per day. Service plan information for UE 105 may be provisioned to UT server 180, for example, when account for UE 105 is created with a service provider.

As shown in FIG. 8, UE 105 may request a tenth connection during the same day (801), which would be permitted under the service plan for UE 105. RAN 110 may provide a connection setup request to AMF 125 (802), AMF 125 may provide a connection indication to UT server 180 (803), and eventually the connection is authorized and serviced.

After the tenth attachment by UE 105 to RAN 110 within the same day, UT server 180 may determine that UE 105 has reached the per-day connection limit (e.g., the control parameter) for the subscriber's service plan. For example, after receiving the tenth connection indication from AMF 125, a comparison of control parameter value field 424 and charging log field 425 in charging table 420 may show that UE 105 has reached a 10-connection daily limit. UT server 180 may generate control instructions (804) to prevent additional connection attempts by UE 105 during that day. In another implementation, UT server 180 may generate control instructions in response to the first connection indicator that exceeds the ten-connection parameter for UE 105.

In one implementation, the control instructions from UT server 180 may include a back-off period (e.g., equal to the number of hours remaining in the day) for UE 105. In another implementation, the control instructions from UT server 180 may provide instructions to AMF 125 or RAN 110 to determine the back-off period for UE 105. In any event AMF 125 may provide back-off instructions to UE 105 to prevent additional "ping" request from UE 105 until the next day.

While FIG. 8 provides an example of subscription-based connection control based on a number of RAN connections, in other implementations, subscription-based connection controls may be based on connection durations (e.g. within a day, week, month, etc.) by a UE 105 using similar network communications.

In another implementation, the number of PRBs sent by UE 105 over a period may be used as a control parameter for radio-connectivity-based charging. The PRB is the minimum unit of radio resource allocation. A scheduling function at a base station (e.g., eNode B) assigns the PRBs to carrier data and passes them to UE 105. RAN-resource-based charging allows operators to charge customers based on the amount of PRBs consumed during each session. Charging based on radio resource usage provides finer granularity for operators to control the radio costs. RAN 110 may report PRB usage to AMF 125 (e.g. via the NG2 interface). Similar to process described above, AMF 125 may forward the PRB data to UT server 180 for logging, monitoring, and managing. Radio-connectivity-based charging using PRBs may be well-suited for IoT devices with fixed locations and low data usage.

According to implementations described herein, a method is provided for performing RAN-usage-based tracking a wireless core network. The method includes receiving a connection authorization request from a radio access network (RAN); obtaining a service plan code for a communication device associated with the connection authorization request; associating, based on the service plan code, the communication device with a RAN-usage-based plan; and sending, in response to the associating, tracking instances of RAN usage by the communication device to a usage-tracking server device.

Adoption as an industry standard of the tracking interface and radio-connectivity-based charging described herein may enable wireless service providers to offer and enforce service plans for IoT devices and other characterized by sporadic data transmissions.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (such as a processor, an ASIC, or a FPGA) or a combination of hardware and software. The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such.

What is claimed is:

1. A method, comprising:
    obtaining, by one or more network devices, a plan code for a communication device connecting to a radio access network (RAN);
    associating, by the one or more network devices and based on the plan code, the communication device with a RAN-usage-based plan;
    reporting, by the one or more network devices and after the associating, a tracking instance of RAN usage by the communication device;
    obtaining, by the one or more network devices, another plan code for a different communication device connecting to the RAN; and
    not reporting, by the one or more network devices and based on the other plan code, other tracking instances of RAN usage by the different communication device.

2. The method of claim 1, wherein the one or more network devices include an access and mobility management function (AMF) for a wireless core network.

3. The method of claim 1, further comprising:
    monitoring the tracking instance against a control parameter for the RAN-usage-based plan associated with the plan code; and
    identifying that the tracking instance exceeds the control parameter.

4. The method of claim 3, further comprising:
    generating control instructions for the communication device to limit RAN activity in response to identifying that the tracking instance exceeds the control parameter.

5. The method of claim 4, wherein the control instructions for the communication device to limit RAN activity include:
    instructions to block the communication device from establishing a connection with the RAN until a back-off timer expires.

6. The method of claim 3, wherein the control parameter includes one of:
    a designated number of connections to the RAN by the communication device within a time period, or
    a duration of connection time to the RAN by the communication device within the time period.

7. The method of claim 1, wherein reporting the tracking instance of RAN usage includes sending the tracking instance via a dedicated tracking interface between the one or more network devices and a usage-tracking server device.

8. The method of claim 1, further comprising:
    receiving, by the one or more network devices, an authorization request for the communication device to connect to a wireless core network.

9. The method of claim 1, wherein the tracking instances include one or more of a change in a mobility management (MM) state for the communication device or non-access stratum (NAS) signaling by the communication device.

10. The method of claim 1, further comprising:
    receiving, by the one or more network devices and prior to obtaining the other plan code for the different communication device, a connection authorization request for the different communication device to connect to the wireless core network.

11. A system, comprising:
    a network device for a wireless core network, the network device including a first memory and a first processor to execute instructions in the first memory to:
        receive a connection authorization request, for a communication device, from a radio access network (RAN);
        associate, based on the receiving, the communication device with a RAN-usage-based plan;
        report, after the associating, a tracking instance of RAN usage by the communication device; and
        forward control instructions for the communication device to limit RAN activity when the tracking instance exceeds a control parameter for the RAN-usage-based plan.

12. The system of claim 11, wherein the network device includes an access and mobility management function (AMF).

13. The system of claim 11, further comprising:
    a usage-tracking server device for the wireless core network, the usage-tracking server device including a second memory and a second processor to execute instructions in the second memory to:
        monitor the tracking instance against a control parameter for the RAN-usage-based plan; and
        identify that the tracking instance exceeds the control parameter.

14. The system of claim 13, wherein the control parameter includes one of:
    a designated number of connections to the RAN by the communication device within a time period, or
    a duration of connection time to the RAN by the communication device within the time period.

15. The system of claim 13, wherein the second processor is further to execute instructions in the second memory to:
    generate the control instructions for the communication device to limit RAN activity in response to identifying that the tracking instance exceeds the control parameter.

16. The system of claim 11, wherein, when reporting the tracking instance of RAN usage by the communication device, the first processor is further to:
    use a dedicated interface between the network device and a usage-tracking server device.

17. A non-transitory computer-readable medium storing instructions executable by a computational device to:
    receive a connection authorization request, for a communication device, from a radio access network (RAN);
    associate, based on the receiving, the communication device with a RAN-usage-based plan;
    report, after the associating, a tracking instance of RAN usage by the communication device; and
    forward control instructions for the communication device to limit RAN activity when the tracking instance exceeds a control parameter for the RAN-usage-based plan.

18. The non-transitory computer-readable medium of claim 17, wherein the instructions to forward the control instructions for the communication device further include instructions to:
    apply a back-off period for the communication device, or
    determine the back-off period for the communication device.

19. The non-transitory computer-readable medium of claim 17, wherein the instructions to report the tracking instance of RAN usage include instructions to send the tracking instance via a dedicated interface.

20. The non-transitory computer-readable medium of claim 17, wherein the non-transitory computer-readable medium is included within an access and mobility management function (AMF) of a wireless core network.

* * * * *